COLOUR TELEVISION SYSTEM INCLUDING MEANS FOR SEPARATELY DERIVING THE LUMINANCE COMPONENT

Filed May 14, 1963

United States Patent Office 3,281,528

Patented Oct. 25, 1966

3,281,528

COLOUR TELEVISION SYSTEM INCLUDING MEANS FOR SEPARATELY DERIVING THE LUMINANCE COMPONENT

Ivanhoe John Penfound James, London, England, assignor to Electric & Musical Industries Limited, Hayes, Middlesex, England, a company of Great Britain.

Filed May 14, 1963, Ser. No. 280,303

Claims priority, application Great Britain, Nov. 9, 1962, 42,514/62

5 Claims. (Cl. 178—5.4)

Figure 1:
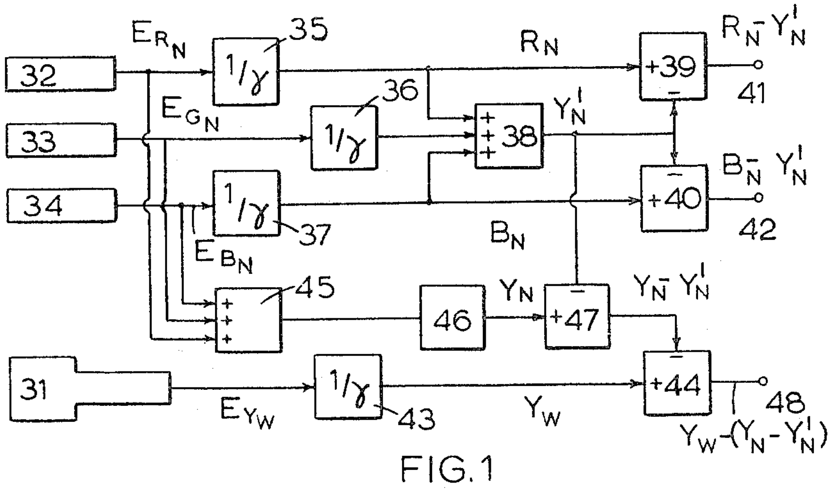

The present invention relates to colour television systems, and in particular to the composition of the colour television video waveform.

The video waveform of the N.T.S.C. television system comprises a monochrome component and two colour difference components. The monochrome component is expressed as:

$$lE_R^{1/\gamma}+mE_G^{1/\gamma}+nE_B^{1/\gamma}$$

where $E_R$, $E_G$ and $E_B$ are signals representing the red, green and blue components of the picture to be transmitted, and $l$, $m$ and $n$ are numerical constants which, in order to comply with the so-called constant luminance principle, are usually 0.30, 0.59 and 0.11 respectively. A monochrome component expressed as above is hereinafter denoted as $Y'$ and is a luminance signal formed by the summation of gamma corrected colour component signals. The colour difference signals of an N.T.S.C. system are, moreover, $R-Y'$ and $B-Y'$ respectively, where R and B represent $$E_R^{1/\gamma} \text{ and } E_B^{1/\gamma}$$

The colour difference signals are, moreover, confined to relatively narrow frequency bands compared with the frequency band of the monochrome signal.

A disadvantage of the N.T.S.C. system is that the monochrome component does not represent the true luminance of the picture, some of the luminance information being conveyed only by the colour difference signals. Therefore, when the picture is reproduced by the colour television receiver some of the luminance is reproduced with the low definition of the colour signals, and if the picture is reproduced in a monochrome receiver some of the luminance information is not reproduced at all. In order to overcome this disadvantage, it has been proposed to change the composition of the monochrome signal so that it represents more accurately the luminance of the picture. Such a signal may be expressed as:

$$(lE_R+mE_G+nE_B)^{1/\gamma}$$

where $l$, $m$ and $n$ are again numerical constants and may be 0.30, 0.59 and 0.11 respectively. A monochrome signal which is a true gamma corrected luminance signal will be noted hereinafter as Y, and where such a monochrome signal is transmitted, there is then the choice of transmitting colour difference signals which either have the compositions expressed above, or have compositions expressed by $R-Y$ and $B-Y$ respectively. The term "gamma corrected luminance signal" is used herein and in the claims to denote a luminance signal which is gamma corrected as a whole as distinct from a luminance signal which is formed by the summation of individually gamma corrected colour component signals. However, the transmission of a monochrome signal which is a true luminance signal has the disadvantage that it becomes more difficult to achieve the correct colour rendering at a receiver, and if a receiver is designed for the reception of the N.T.S.C. video waveform, all the colour signal voltages derived at the receiver for application to the colour reproducing tube are incorrect if the colour difference signals are of the form $R-Y'$ and $B-Y'$ respectively, and the green signal voltage is incorrect if the colour difference signals are of the form $R-Y'$ and $B-Y'$ respectively, and the green signal voltage is incorrect if the colour difference signals are of the form $R-Y$ and $B-Y$ respectively.

The object of the present invention is to provide an improved colour television system with a view to reducing the disadvantages indicated in the preceding paragraph.

According to the present invention there is provided a colour television system comprising means for producing a video waveform representing a picture to be transmitted comprising means including a first pick-up tube for generating a luminance signal of the form $$Y_W-(Y_N-Y'_N)$$

wherein $Y_W$ is a relatively wide frequency band gamma corrected luminance signal derived from said first pick-up tube, $Y_N$ is a relatively narrow frequency band gamma corrected luminance signal and $Y'_N$ is a relatively narrow frequency band luminance signal formed by the summation of gamma corrected colour component signals, means including further pick-up tube means for generating two relatively narrow band colour difference signals of the form $$E_{R_N}{}^{1/\gamma}-Y'_N$$

and $$E_{B_N}{}^{1/\gamma}-Y'_N$$

wherein $E_{R_N}{}^{1/\gamma}$ and $E_{B_N}{}^{1/\gamma}$ are respectively gamma corrected signals representing the red and blue colour components of the picture.

The invention lends itself particularly to systems in which the wide and narrow band luminance signals $Y_W$ and $Y_N$ are derived from a single pick-up tube and the narrow band signals $Y'_N$, $R_N$ and $B_N$ are derived from a separate set of pick-up tubes. The luminance pick-up tube may be of a different type from the tubes of the separate set having, for example, a different spectral response. For example the luminance tube may be an image orthicon tube and the separate set of tubes may comprise photoconductive pick-up tubes.

In order that the invention may be clearly understood and readily carried into effect it will now be described with reference to the accompanying drawings the two figures of which illustrate in diagrammatic form apparatus for producing the video waveform in a colour television system according to two examples of the invention.

Referring to FIGURE 1 of the drawings the apparatus illustrated embodies a colour television camera having four pick-up tubes 31 to 34. The tube 31 is a separate luminance tube arranged to produce a luminance signal $E_{Y_W}$, the tube 31 being an image orthicon tube. The three other tubes comprise a separate set arranged to produce video signals $E_{R_N}$, $E_{G_N}$, $E_{B_N}$, respectively. The three other tubes 32, 33 and 34 are vidicon pick-up tubes.

The suffix W denotes that the respective signal is a wide band signal and the suffix N denotes that the respective signal is a relatively narrow band signal. The video signals from the tubes 32, 33 and 34 are applied to the gamma correction circuits 35, 36 and 37 respectively from which the gamma corrected colour video signals $R_N$, $G_N$ and $B_N$ are respectively produced. The gamma corrected signals $R_N$, $G_N$ and $B_N$ are all applied to a combining circuit 38 which produces as an output signal $Y'_N$. This narrow band luminance signal is subtracted from the gamma corrected red colour signal and the gamma corrected blue colour signal by the differencing circuits 39 and 40 respectively. The outputs of the differencing circuits 39 and 40 are respectively the red and blue gamma corrected colour difference signals $R_N-Y'_N$ and $B_N-Y'_N$ which are applied to the terminals 41 and 42.

Figure 2:
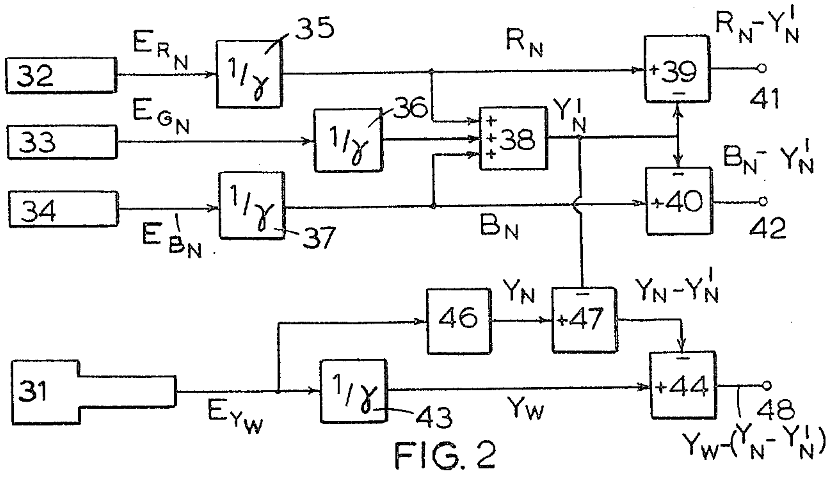

The luminance signal output from the tube 31, $E_{Y_W}$ is applied to the gamma correction circuit 43 which converts the signal to $Y_W$ which is applied as one input to the differencing circuit 44. The uncorrected colour video signals $E_{R_N}$, $E_{G_N}$ and $E_{B_N}$ from the tubes 32, 33 and 34 are combined in the combining circuit 45 to produce a narrow band luminance signal $E_{Y_N}$. As already mentioned, and as shown in FIGURE 2, the narrow band luminance signal $E_{Y_N}$ can be derived directly from the tube 31″. This is gamma corrected in the circuit 46 to produce $Y_N$ and applied to one input of a differencing circuit 47 in which the output $Y'_N$ of the combining circuit 38 is subtracted from it so that the output of the differencing circuit 47 is $Y_N-Y'_N$. The last mentioned signal is subtracted from the wide band gamma corrected luminance signal $Y_W$ by the differencing circuit 44 to produce at the output terminal 48 the desired luminance signal $$Y_W-(Y_N-Y'_N)$$

The luminance difference signal $(Y_N-Y'_N)$ is zero for grey scale picture elements and increases as the product of luminance and saturation increases. Also since both luminance components of the luminance difference signal are derived from the same three pick-up tubes 32, 33 and 34, the noise and lag contributions will be comparatively small.

The spectral sensitivity response of an image-orthicon differs from that required of the luminance signal by the N.T.S.C. receiver. Suppose that the luminance signal derived from the gamma correction circuit 43 $Y_W$ is of the form $$(lE_R+mE_G+nE_B)_W{}^{1/\gamma}$$

where $l$, $m$ and $n$ are not the normal N.T.S.C. coefficients. If the luminance difference signal $Y_N-Y'_N$ is derived from $$Y_N-(0.30E_R{}^{1/\gamma}+0.59E_G{}^{1/\gamma}+0.11E_B{}^{1/\gamma}$$

and $$Y_N=(lE_R+mE_G+nE_B)_N{}^{1/\gamma}$$

then the modified luminance signal produced by the circuit arrangement shown in the figure will be of the form required by the N.T.S.C. specification for low frequency components and it is these components which effect the colour reproduction to the greater extent. Thus it may be possible to avoid the insertion of an optical filter in the light path to the image orthicon 31, thereby avoiding a reduction in the light reaching the tube from the scene which reduction may be as much as half.

Errors in the colour signals also arise because the theoretically required transmission curves for the colour separation filters in the colour pick-up tubes 32, 33 and 34 have negative going portions and the filters which are used in practice have no such negative going portions. Such errors may be reduced by a modification of the luminance tube characteristic in a four pick-up tube type of camera. This modification to the luminance tube characteristic may be achieved by adjustment of the coefficients in the circuits 38 and 45 in the circuit shown in the figure, so that $$Y'_N=pE_{R_N}{}^{1/\gamma}+qE_{G_N}{}^{1/\gamma}+rE_{B_N}{}^{1/\gamma}$$

and $$Y_N=(aE_R+bE_G+cE_B)_N{}^{1/\gamma}$$

where $a$, $b$ and $c$ and $p$, $q$ and $r$ differ from the N.T.S.C. coefficients.

The tubes represented in the figure may be replaced by other types of tubes and all four tubes may be of the same type.

In an N.T.S.C. receiver which receives the video waveform obtained from apparatus such as illustrated in the figure, the signals applied to the red gun of the reproducing tube is $$R_N-Y'_N+\{Y_W-(Y_N-Y'_N)\}=R_N+(Y_W-Y_N)$$

which for low frequencies is $R_N$ (except in so far as the low frequency components of $Y_W$ do not correspond to $Y_N$) and for high frequencies is $Y_W$ only. The blue and green signals for the reproducing tube have similar compositions.

The invention is also applicable to systems in which the colour difference signals are transmitted sequentially in alternate lines by amplitude or frequency modulation of a subcarrier oscillation. The invention is moreover applicable to the so-called P.A.L. system of transmission in which I and Q are formed by linear combinations of the colour difference signals and transmitted by quadrature modulation of a sub-carrier oscillation, the resultant chrominance signal differing from the N.T.S.C. chrominance signal however by reversing the phrase of one of the modulating signals, say the Q signal in alternate line intervals. In such systems, flicker effects can be reduced by using the Y form of signal compared with the Y′ form. Other modes of transmission may also be adopted.

While the invention is effective in reducing substantially the colour errors which would otherwise arise in a linear receiver of N.T.S.C. or other type, due to the transmission of a true gamma corrected luminance signal, means may be provided in receivers for reducing still further the residual errors.

What we claim is:

1. A colour television system comprising means for producing a video waveform representing a picture to be transmitted comprising means including a first pick-up tube for generating a luminance signal of the form $$Y_W-(Y_N-Y'_N)$$

wherein $Y_W$ is a relatively wide frequency band gamma corrected luminance signal derived from said first pick-up tube, $Y_N$ is a relatively narrow frequency band gamma corrected luminance signal and $Y'_N$ is a relatively narrow frequency band luminance signal formed by the summation of gamma corrected colour component signals, means including further pick-up tube means for generating two relatively narrow band colour difference signals of the form $$E_{R_N}{}^{1/\gamma}-Y'_N$$

and $$E_{B_N}{}^{1/\gamma}-Y'_N$$

wherein $E_{R_N}{}^{1/\gamma}$ and $E_{B_N}{}^{1/\gamma}$ are respectively gamma corrected signals representing the red and blue colour components of the picture.

2. A colour television system comprising a first pick-up tube for generating a relatively wide frequency band signal representing the luminance of a picture to be transmitted, means for gamma correcting said signal to produce a gamma corrected luminance signal $Y_W$, further pick-up tube means for generating three colour component signals representing respectively the red, green and blue components of said picture, means for individually gamma correcting said colour components signals to produce gamma corrected colous components signals $E_R{}^{1/\gamma}$, $E_G{}^{1/\gamma}$ and $E_B{}^{1/\gamma}$, circuit means responsive to the signals $Y_W$, $E_R{}^{1/\gamma}$, $E_G{}^{1/\gamma}$ and $E_B{}^{1/\gamma}$ for producing a luminance signal of the form:

$$Y_W-(Y_N-Y'_N)$$

and for producing two colour difference signals of the respective forms:

$$E_{R_N}{}^{1/\gamma}-Y'_N$$
$$E_{B_N}{}^{1/\gamma}-Y'_N$$

where the suffix N denotes signals of a frequency band width which is less than that of the signal $Y_W$, where $Y_N$ denotes a gamma corrected luminance signal which in said narrower frequency band is similar to $Y_W$, where $Y'_N$ denotes a luminance signal produced by the summation of gamma corrected signals proportional respectively to $E_{RN}{}^{1/\gamma}$, $E_{GN}{}^{1/\gamma}$ and $E_{GN}{}^{1/\gamma}$.

3. A colour television system according to claim 2 in which said first pick-up tube is an image orthicon tube and said further pick-up tube means includes photoconductive tubes.

4. A colour television system comprising means for producing a video waveform representing a picture to be transmitted comprising means for generating a relatively wide frequency band signal $Y_W$ having the composition $$(lE_{RN}+mE_{GN}+nE_{BN})^{1/\gamma}$$

where $E_{RN}$, $E_{GN}$ and $E_{BN}$ are respectively relatively wide frequency band signal components representing the red, green and blue components of the picture, and $l$, $m$ and $n$ are numerical constants which differ respectively from 0.30, 0.59 and 0.11, means for generating a relatively narrow frequency band signal $Y_N$ having the composition $$(lE_{RN}+mE_{GN}+nE_{BN})^{1/\gamma}$$

where $E_{RN}$, $E_{GN}$ and $E_{BN}$ are respectively relatively narrow frequency band signal components representing the red, green and blue components of the picture, means for generating a relatively narrow frequency band signal $Y'_N$ having the composition $$0.30E_{RN}{}^{1/\gamma}+0.59E_{GN}{}^{1/\gamma}+0.11E_{BN}{}^{1/\gamma}$$

means responsive to said signals $Y_W$, $Y_N$ and $Y'_N$ to form a luminance signal $$Y_W-(Y_N-Y'_N)$$

and means for forming two colour difference signals having the composition $$E_{RN}{}^{1/\gamma}-Y'_N$$

and $$E_{BN}{}^{1/\gamma}-Y'_N$$

5. A colour television system comprising means for producing a video waveform representing a picture to be transmitted comprising means for generating a relatively wide frequency band signal $Y_W$ having the composition $$(lE_{RW}+mE_{GW}+nE_{BW})^{1/\gamma}$$

when $E_{RW}$, $E_{GW}$ and $E_{BW}$ are respectively relatively wide frequency band signal components representing the red, green and blue components of the picture, and $l$, $m$, and $n$ are numerical constants which differ respectively from 0.30, 0.59 and 0.11, means for generating a relatively narrow frequency band signal $Y_N$ having the composition $$(aE_{RN}+bE_{GN}+cE_{BN})^{1/\gamma}$$

where $E_{RN}$, $E_{GN}$ and $E_{BN}$ are respectively relatively narrow frequency band components representing the red, green, and blue components of the picture, and $a$, $b$ and $c$ are numerical constants which differ respectively from 0.30, 0.59 and 0.11, means for generating a relatively narrow frequency band signal $Y'_N$ having the composition $$(pE_{RN}{}^{1/\gamma}+qE_{GN}{}^{1/\gamma}+rE_{BN}{}^{1/\gamma})$$

where $p$, $q$ and $r$ are numerical constants which differ respectively from 0.30, 0.59 and 0.11, means responsive to said signals $Y_W$, $Y_N$ and $Y'_N$ to form a luminance signal $$Y_W-(Y_N-Y'_N)$$

and means for forming two colour difference signals having the composition $$E_{RN}{}^{1/\gamma}-Y'_N$$

and $$E_{BN}{}^{1/\gamma}-Y'_N$$

References Cited by the Examiner

UNITED STATES PATENTS

| | | | |
|---|---|---|---|
| 2,773,116 | 12/1956 | Chatten | 178—5.2 |
| 2,803,697 | 8/1957 | Gibson | 178—5.4 |
| 3,196,205 | 7/1965 | Bedford | 178—5.4 |

OTHER REFERENCES

Pages 230–231, January 1954, Livingston, Reproduction of Luminance Detail by NTSC Color Television Systems, Proceedings of the I.R.E., vol. 42, No. 1.

DAVID G. REDINBAUGH, *Primary Examiner.*

J. A. O'BRIEN, *Assistant Examiner.*